United States Patent [19]

Wlodarczyk et al.

[11] Patent Number: 4,866,269
[45] Date of Patent: Sep. 12, 1989

[54] OPTICAL SHAFT POSITION AND SPEED SENSOR

[75] Inventors: Marek T. Wlodarczyk, Birmingham; Dah-Lain Tang, Canton, both of Mich.

[73] Assignee: General Motors Corporation, Detroit, Mich.

[21] Appl. No.: 195,760

[22] Filed: May 19, 1988

[51] Int. Cl.⁴ .............................. G01D 5/34; H01J 5/16
[52] U.S. Cl. ........................ 250/231 SE; 250/237 G
[58] Field of Search ................... 250/231 SE, 237 G; 340/347 P; 356/395; 33/125 C

[56] References Cited

U.S. PATENT DOCUMENTS

| | | | |
|---|---|---|---|
| 3,418,989 | 12/1968 | Silverman | 123/613 |
| 3,719,177 | 3/1973 | Oishi et al. | 123/494 |
| 3,757,755 | 9/1973 | Carner | 280/231 |
| 4,146,001 | 5/1979 | McCarthy et al. | 123/416 |
| 4,451,731 | 5/1984 | Leonard | 250/231 SE |
| 4,604,725 | 8/1986 | Davies et al. | 364/900 |
| 4,668,862 | 5/1987 | Waibel | 250/231 SE |

Primary Examiner—David C. Nelms
Assistant Examiner—William L. Oen
Attorney, Agent, or Firm—C. R. Meland

[57] ABSTRACT

A fiber optic detector head senses a light reflective or transmissive pattern on an encoder disk rotated by an engine shaft. The pattern results in four different light levels which are translated by a detector into an electrical pulse train having four different voltages including a reference or background voltage. One light level is reserved for an index mark, another level for cylinder position marks and still another level for finer measurement of position and speed between the cylinder marks. Patterns encoded into the single pulse train are decoded by a microprocessor to provide specific engine cylinder position information as well as engine speed information.

11 Claims, 3 Drawing Sheets

4,866,269

OPTICAL SHAFT POSITION AND SPEED SENSOR

FIELD OF THE INVENTION

This invention relates to apparatus for obtaining information on shaft position and particularly to electro-optical apparatus for sensing engine speed and cylinder position.

BACKGROUND OF THE INVENTION

Electronic control of machines frequently requires information about the machine operation to be furnished to the control circuit. The absolute angular position of a rotating shaft and the shaft speed are data which are used in many control methods. In particular, ignition or fuel injection control of internal combustion engines makes use of information about the engine speed, even on an instantaneous basis, and the cylinder position. Then it is possible for the fuel or ignition circuit to apply fuel or ignition voltage to the proper cylinder at the precise time for optimum performance.

It is known to use magnetic pickups with a gear or other toothed wheel to sense the rotation of an engine shaft such as a cam shaft or crank shaft, and to use a special index tooth or a separate pickup to establish the shaft position once each revolution. Similar arrangements using optical pickups with optical encoder disks are also known. Such disks have tracks of black and white patterns or transparent and opaque patterns to furnish binary data. Optical encoder disks with many tracks furnish several bits of digital information which makes accurate position information possible. This requires many optical detectors, as well, thereby making such a system expensive. Such a device is shown in the U.S. Pat. No. 3,757,755 to Carner which is applied to engine control. A simpler apparatus is shown in U.S. Pat. No. 4,604,725 to Davies et al; a code track and a timing track are used along with two, or preferably four, fiber optic pickups to obtain position information only. Both of these patent disclosures specify binary codes on the encoder disk. This is the usual case since binary codes are easy to read and traditionally are thought to be readily interfaced with digital control circuitry. On the other hand binary codes using "1" and "0" as information bits are limited in the amount of information content.

The need for sufficient information for accurate control purposes has led to complex designs as discussed above, yet it is generally acknowledged that simple designs are superior, if they accomplish the required function, because they are generally less expensive, more trouble free, and easier to maintain. In this invention it is recognized that by departing from binary codes, information may be compacted so that a single encoded track carries both speed and angular position information, and yet traditional binary digital circuitry can decode the information quickly and efficiently. Decoding the information will require processing, usually by a microprocessor shared by other functions such as engine spark and fuel control, and thus it is highly desirable that the processor burden be minimized.

SUMMARY OF THE INVENTION

It is therefore an object of the invention to provide an optical and electronic apparatus for sensing engine speed and cylinder position using only a single optical pickup. It is a further object to provide such an apparatus for any shaft speed sensor and position detector. Still another object is to provide such an apparatus which requires minimal processing to render useful data.

DESCRIPTION OF THE DRAWINGS

The above and other advantages of the invention will become more apparent from the following description taken in conjunction with the accompanying drawings herein like references refer to like parts and wherein.

DESCRIPTION OF THE PREFERRED EMBODIMENT

Figure 1:
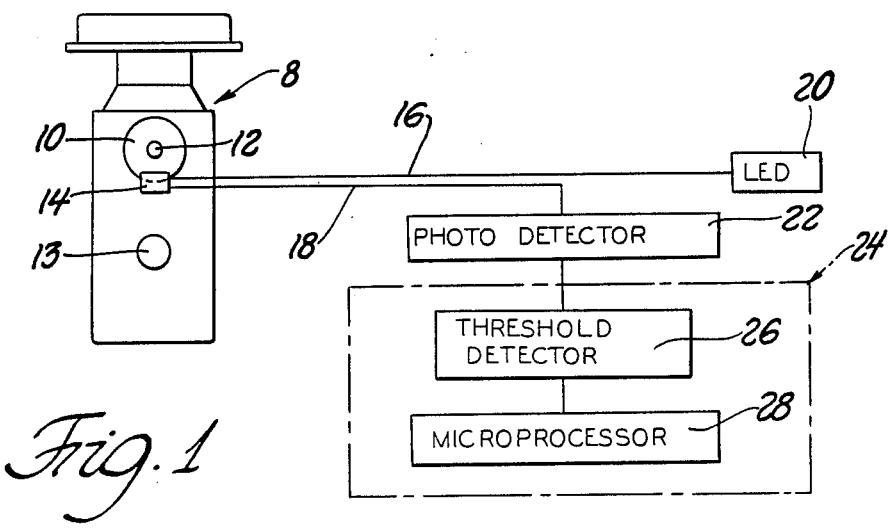
FIG. 1 is a schematic diagram of an engine speed and position detector according to the invention.

FIG. 1 shows a shaft speed and position detector applied to an automotive engine 8 comprising a encoder disk 10 mounted on a cam shaft 12 for rotation with the shaft, an optical sensing head 14 closely spaced from the disk 10, the head 14 comprising a pair of optical fibers 16 and 18 respectively coupled to an LED light source 20 and a photodiode detector 22, and a decoder circuit 24 connected to the output of the detector 22. The LED provides light to the head 14 which illuminates a spot on the encoder disk and light reflected from the spot is picked up by the fiber 18 which transmits the light to the detector 22 where the received light intensity is translated into an output voltage. While the encoder disk 10 is coupled to the cam shaft 12, it can be driven instead by another engine shaft such as the crank shaft 13, or the distributor shaft (not shown). The detection scheme as described thus far is well known and further detail is not deemed to be necessary except as described below. On the other hand, the particular encoding arrangement is new and provides advantages not heretofore realized in shaft sensor systems.

Figure 2:
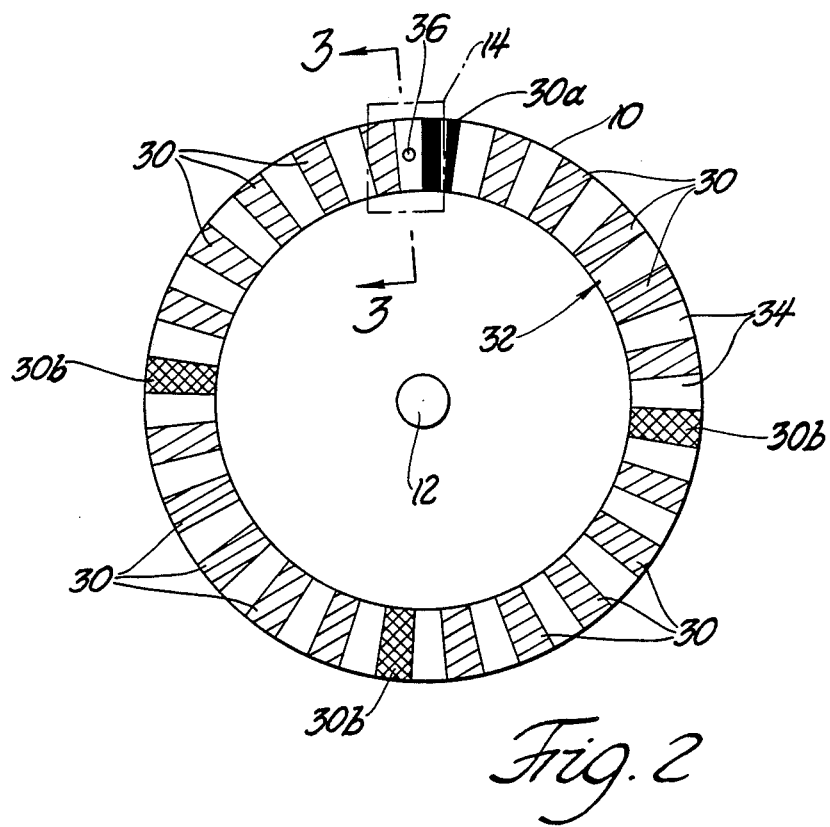
FIG. 2 is a front view of an encoder disk for the apparatus of FIG. 1 showing the encoder pattern according to the invention.
Figure 3:
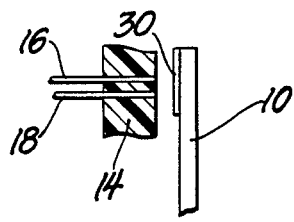
FIG. 3 is a cross section view taken along lines 3—3 of FIG. 2 showing a section of the disk and sensing head according to the invention.

As shown in FIGS. 2 and 3, the face of the encoder disk 10 incorporates a plurality of spaced reflective segments 30 of equal size arranged in a circular track 32 on a nonreflective or absorbing background 34. The track is aligned with the sensor head 14 so that light from the head illuminates a spot 36 on the track 32 and light is reflected to the head 14 in accordance with the reflectivity at the illuminated spot. The segments 30 are equally spaced so that as the shaft and the disk 10 rotate the light reflected from the disk to the sensor head 14 will be in the form of pulses which mark the passage of the segments 30. The pulses then provide information on the rotation of the shaft or its relative position. The time interval between the pulses is an inverse function of the shaft speed. Absolute position information, however, is provided by special characteristics of selected index segments 30a and 30b at disk angular positions corresponding to given shaft positions.

A primary index segment 30a, indicated as black, has the greatest reflectivity of all the segments so that it will produce the highest pulse amplitude when sensed by the detector 22. This segment is arranged on the wheel at a position corresponding to cylinder number one. Thus, whenever the highest pulse is received that cylinder position is identified. Secondary index segments 30b (crosshatched) are positioned at 90 degree intervals from the index segment 30a and have light reflectivity midway between the index segment 30a and that of the ordinary segments 30 (single hatched) to produce voltage pulses of intermediate amplitude. The ordinary segments 30, spaced between the index segments 30a and 30b, have a higher reflectivity than the light absorbing background and produce small pulses while the background (shown as white) yields a substantially zero or a low voltage at the detector output. Thus, including the background, the disk has four different reflectivities and four different voltages are produced by the detector 22 for analysis by the decoder circuit 24.

Figure 4:
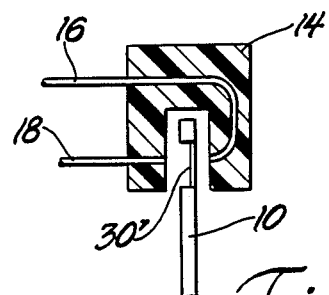
FIG. 4 is a cross section view like that of FIG. 3 showing an alternative form of the encoder disk and sensing head.

A transmissive encoding scheme as shown in FIG. 4 is an alternative to the reflective arrangement discussed above. Each segment 30' is a filter so that light is transmitted from the fiber 16 and passes through the segment 30' to the fiber 18 and the light modulation received at the detector is equivalent to the reflective case.

Figure 5:
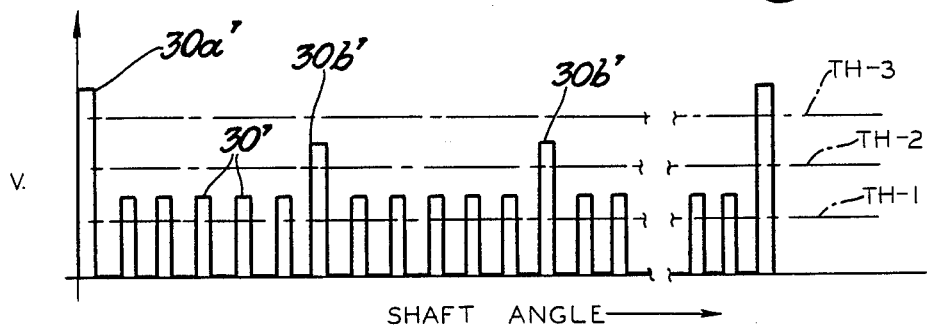
FIG. 5 is a detector output voltage wave form graph.

The detector 22 voltage pattern is shown in FIG. 5 which displays voltage versus shaft angle. Each pulse corresponds to a reflective segment and has a voltage which exceeds a first threshold level TH-1. In the case of segments 30b the corresponding pulse 30b' amplitude exceeds a second higher threshold TH-2. The primary index segment 30a produces a pulse 30a' greater than a threshold TH-3. Each pulse is separated from its neighbor by a voltage lower than TH-1. That lower voltage may be zero if the absorbing background of the disk 10 reflects no light. However it is necessary only that the separating voltage be lower than the threshold TH-1 for then it, as well as the other voltage levels, can be recognized by the decoder circuit 24. It will be apparent as the description proceeds that it is essential that at least four voltage levels be provided to encode both the speed and position information on the single pulse train. It is not essential that the zero or low voltage represent the space between the pulses, i.e., the track 32 can use a highly reflective spacer or background and lower or different reflective levels for the segments. The decoder logic can be adjusted to accommodate any such variations on the principle. The important consideration is that the ordinary segments 30 and the index segments 30a and 30b yield unique identifiable voltage amplitudes and that the speed information be preserved in the code.

Figure 6:
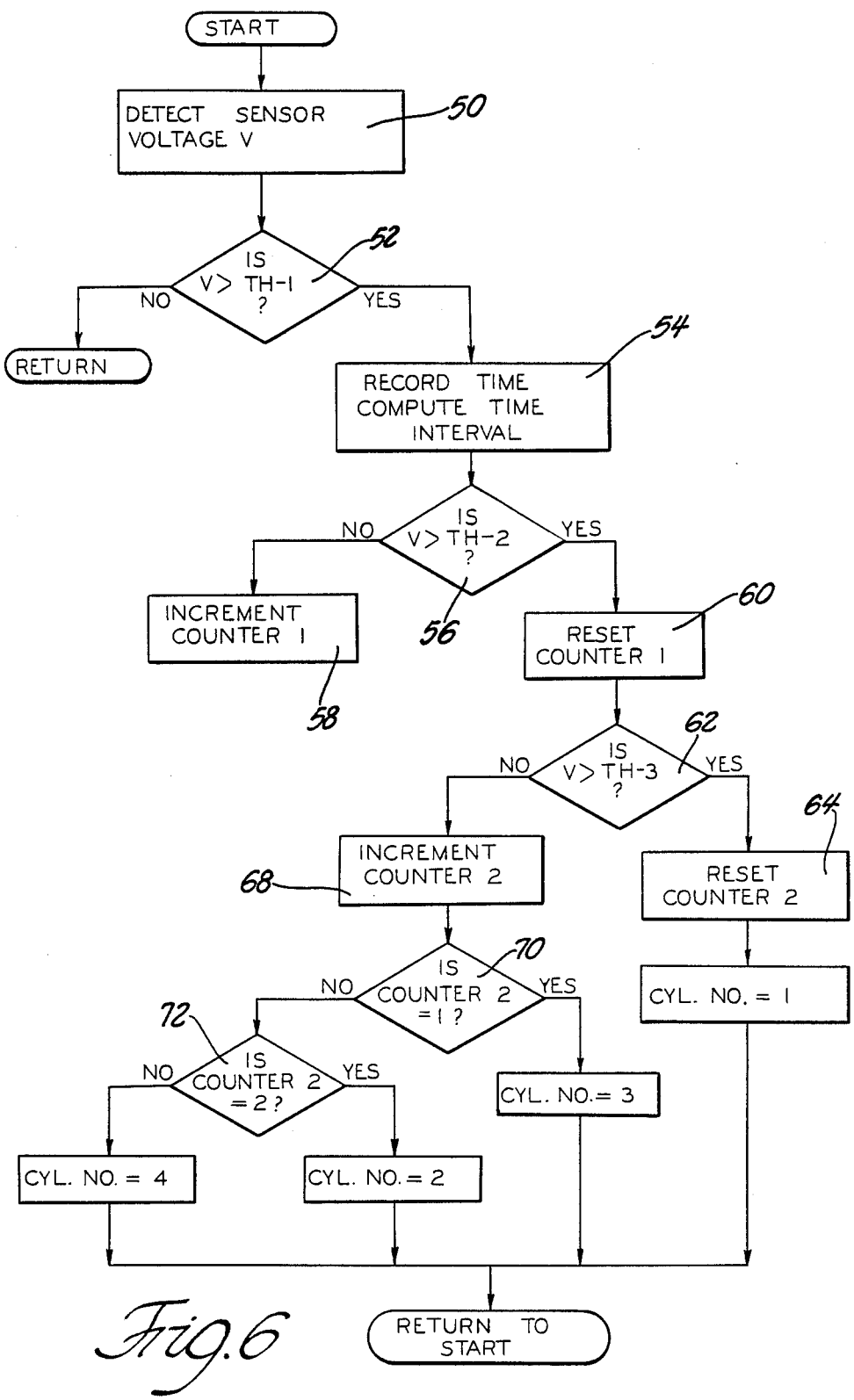
FIG. 6 is a flowchart of the decoding logic used by the detector of FIG. 1.

To decode the voltage pattern the decoder circuit 24 is provided with threshold detectors 26 to detect the voltage levels in the pulse train and a logic circuit in the form of a microprocessor 28 to analyze the pulse sequence of pulse amplitudes and correlate the shapes to shaft positions. Internal memory locations in the microprocessor 28 are designated as counters. The microprocessor is programmed in accordance with the functions of the flow chart of FIG. 6.

The flow chart is described according to the functions shown in each block, the reference numeral in angle brackets referring to the block for the particular function. After START, the sensor voltage is read <50> and is compared to the threshold TH-1 <52>. If the voltage is lower than TH-1 the program returns to START but if it is higher the time of the pulse is recorded and the time interval since the last pulse is computed <54>. This time interval is an inverse function of the shaft speed. Then the voltage V is compared to the second threshold TH-2 <56> to determine whether a index segment has been detected. If not, a counter 1 is incremented <58> to count the number of regular pulses subsequent to any index pulse. If the voltage is greater than TH-2, the pulse is an index pulse and the counter 1 is reset <60>. Following that, the pulse amplitude is tested against TH-3 to determine if the third threshold has been exceeded <62>. If it has then a primary index pulse 30a' has been received and the counter 2 is reset to zero <64>, indicating the cylinder number 1 position <66>. If the voltage is not greater than TH-3 <62>, the counter 2 is incremented <68>. Then the counter 2 contents is tested <70> and <72> to determine which cylinder position is signaled by the encoded data. The counter 1 indicates the shaft position with respect to the last identified cylinder position and is used as an accurate timing mark for fuel injection or spark firing.

The above description applies specifically to a four cylinder engine having the encoder disk driven by the cam shaft so that each encoder position is uniquely related to the engine position. The same encoder disk could be driven by the crank shaft of an eight cylinder engine and then each of the four index segments would correspond to a pair of cylinders. Of course the disk and the decoder logic can be modified for six cylinder or other engines for operation either by the crank shaft or the cam shaft.

Figure 7:
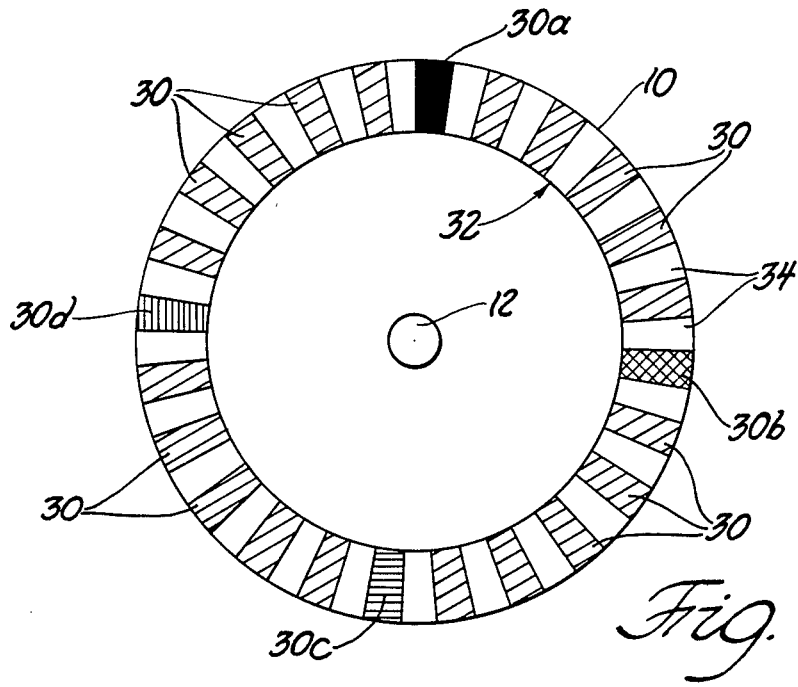
FIG. 7 is another embodiment of an encoder disk having a different encoder pattern according to the invention.

As described above, the system must identify the primary index before determining the cylinder position since the primary segment 30a is the only unique position indicator, resulting in a delay of up to one revolution of the shaft before cylinder position is known. However more than one unique index can be provided so that the cylinder position is established as soon as any unique index is sensed. A simple example of this is an encoder disc with one primary index segment and one secondary index segment mounted on the crankshaft of a four cylinder engine to sense cylinder pairs. As soon as either index segment is sensed a cylinder pair position is identified, thus requiring only a maximum delay of one quarter engine cycle. Another example is shown in FIG. 7 which shows an encoder pattern like that of FIG. 2 except that each of the four index segments 30a, 30b, 30c and 30d have a unique and different reflectivity or transmission level thus yielding electrical pulses of different amplitudes. Of course additional threshold detectors are required to detect the additional levels and the logic circuit will be modified to define the cylinder position for each index segment. When that encoder disk is driven by the cam shaft an absolute position will be detected for each cylinder as soon as its respective segment is sensed.

It will thus be seen that the encoder arrangement and the decoder logic combine to provide a simple and accurate apparatus for determining engine speed and cylinder position. The particular code disclosed here is not the only one which may be devised within the spirit of the invention. Especially the index position may be represented not only by the highest pulse amplitude but also by any unique voltage amplitude. Thus the highest amplitude could represent any of the types of segments or the background itself.

The different reflectivity of the respective areas of track 32 can be provided in various ways. For example, if disk 10 is a steel disk paints having different reflectivities can be used. Further, if disk 10 is a steel disk, the different reflectivity of the respective areas or segments can be provided by roughening or abrading respective areas to different degrees of roughness. Further, the different reflectivities can be provided by polishing areas or segments to different degrees of polish.

The embodiements of the invention in which an exclusive property or privilege is claimed are defined as follows:

1. Means for monitoring the rotary angular position of a shaft comprising:

optical source means for emitting light, modulator means controlled by the shaft for modulating the light in pulses equally spaced with respect to the shaft rotation, the modulator means selectively passing as a function of shaft angular position a plurality of light levels, one of the levels corresponding to a primary index position, a second level corresponding to a plurality of secondary index positions, and another level corresponding to positions spaced in equal angular increments from the shaft index positions, a single optical detector means receiving the modulated light for sequentially generating at least four electrical output levels corresponding to the light levels, said detector means during each shaft revolution generating only one primary index pulse at one of the levels, a plurality of secondary index pulses at a second level, and other pulses at another level representing the equal angular increments from the index positions, and decoder means responsive to the electrical output pulses for determining shaft position.

2. The invention as defined in claim 1 wherein one of the electrical output levels is reserved for a reference or background level.

3. The invention as defined in claim 2 wherein the said modulator means is constructed to effect a background light level between successive pulses whereby the light pulses and the electrical pulses are spaced in time during rotation of the shaft.

4. The invention as defined in claim 1 wherein the decoder includes means for measuring the time interval between pulses to determine shaft speed.

5. The invention as defined in claim 1 wherein the modulator means comprises a disk carrying a plurality of equally spaced segments arrayed in a circular track, the track being disposed in the path between the optical source and detector means, and each segment as well as the space between the segments having the property of diminishing light received by the detector by a set amount whereby pulses of different light levels occur upon disk rotation.

6. The invention as defined in claim 5 wherein the segments are reflective and are arranged in the light path to reflect light from the source means to the detector means.

7. The invention as defined in claim 5 wherein the segments are transmissive and are arranged in the light path to transmit light from the source means to the detector means.

8. Means for sensing speed and cylinder position in an automotive engine having an engine shaft with a rotary position corresponding to cylinder position, comprising a light source and a single detector having an electrical output, a light modulating disk optically between the source and the detector and mounted on the engine shaft for rotation therewith, light amplitude modulating means on the disk for passing light to the detector having a reference amplitude and encoding light in equally spaced pulses with respect to shaft angle, the pulses having first, second and third amplitudes different from the reference amplitude which are a function of shaft angular position, the modulating means being arranged to provide an index pulse at the first amplitude corresponding to one cylinder position, a plurality of cylinder pulses at the second amplitude corresponding to other cylinder positions, and a plurality of intermediate pulses at a third amplitude, a decoder circuit connected to the detector output for sensing the pulse amplitudes and decoding the pulses to reveal cylinder position and engine speed information during engine operation.

9. The invention as defined in claim 8 wherien the reference amplitude is substantially zero.

10. The invention as defined in claim 8 wherein the circuit for sensing the pulse amplitudes and decoding the pulses comprises threshold detectors for discriminating the pulse amplitudes, and logic means responsive to the pulses for determining the cylinder positions.

11. The invention as defined in claim 8 wherein the light amplitude modulating means is arranged to provide pulses at a rate proportional to the speed of the shaft, and wherein the decoder circuit includes means for detecting the time between pulses as a measure of the engine speed.

* * * * *